(12) United States Patent
Song et al.

(10) Patent No.: US 11,856,494 B2
(45) Date of Patent: Dec. 26, 2023

(54) METHOD AND APPARATUS FOR MANAGING SUBSCRIPTION SERVICE IN MACHINE TO MACHINE SYSTEM

(71) Applicants: Hyundai Motor Company, Seoul (KR); Kia Motors Corporation, Seoul (KR); Industry Academy Cooperation Foundation of Sejong University, Seoul (KR)

(72) Inventors: Jae Seung Song, Seoul (KR); Min Byeong Lee, Gyeonggi-do (KR)

(73) Assignees: Hyundai Motor Company, Seoul (KR); Kia Motors Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 32 days.

(21) Appl. No.: 17/572,080

(22) Filed: Jan. 10, 2022

(65) Prior Publication Data

US 2022/0232359 A1     Jul. 21, 2022

Related U.S. Application Data

(60) Provisional application No. 63/137,975, filed on Jan. 15, 2021.

(51) Int. Cl.
*H04W 4/70*     (2018.01)
*H04W 8/18*     (2009.01)

(52) U.S. Cl.
CPC ............. *H04W 4/70* (2018.02); *H04W 8/183* (2013.01)

(58) Field of Classification Search
CPC ................................. H04W 4/70; H04W 8/183
USPC .......................................................... 455/419
See application file for complete search history.

(56) References Cited

U.S. PATENT DOCUMENTS

| | | | |
|---|---|---|---|
| 2016/0088420 A1* | 3/2016 | Kim | H04W 28/16 370/328 |
| 2016/0366663 A1* | 12/2016 | Wang | H04W 4/70 |
| 2017/0006455 A1* | 1/2017 | Cho | G06F 16/9535 |
| 2017/0164138 A1* | 6/2017 | Wu | H04W 72/51 |
| 2019/0124573 A1* | 4/2019 | Yin | H04W 48/20 |
| 2019/0230175 A1* | 7/2019 | Wang, IV | H04L 67/55 |
| 2020/0120464 A1* | 4/2020 | Kim | H04W 12/033 |
| 2020/0288291 A1* | 9/2020 | Wang | H04W 4/50 |
| 2021/0152653 A1* | 5/2021 | Guo | H04L 67/566 |
| 2021/0176186 A1* | 6/2021 | Zhao | H04L 47/822 |

* cited by examiner

*Primary Examiner* — Mark G. Pannell
(74) *Attorney, Agent, or Firm* — Fox Rothschild LLP

(57) ABSTRACT

A subscription service including a number of subscriptions possessed by a device is managed in a machine-to-machine (M2M) system. A method for operating a first device may include: transmitting, to a second device, a first message for requesting a new subscription that uses a first resource for managing subscription; receiving, from the second device, a second message for notifying an update of a second resource associated with the new subscription; and identifying a content of the second resource, wherein the first resource may include at least one of a first attribute indicating a number of subscriptions possessed by the first device, a second attribute indicating, among resources to which the first device is subscribing, a number of resources which are updated but not yet retrieved, or a third attribute indicating an access address of a subscribed resource.

11 Claims, 11 Drawing Sheets

METHOD AND APPARATUS FOR MANAGING SUBSCRIPTION SERVICE IN MACHINE TO MACHINE SYSTEM

CROSS REFERENCE TO RELATED APPLICATION

The present application claims the benefit of U.S. provisional application No. 63/137,975, filed Jan. 15, 2021, the entire contents of which are incorporated herein by reference.

BACKGROUND

(a) Technical Field

The present disclosure relates to a machine-to-machine (M2M) system, more particularly, to a method and apparatus for managing a subscription service in an M2M system.

(b) Description of the Related Art

Recently, the use of Machine-to-Machine (M2M) systems has become more widespread. An M2M communication may refer to a communication performed between machines without human intervention. M2M may encompass Machine Type Communication (MTC), Internet of Things (IoT) or Device-to-Device (D2D). In the following description, the term "M2M" is uniformly used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the one M2M standardization organization provides requirements for M2M communication, things to things communication and IoT technology, and technologies for architecture, Application Program Interface (API) specifications, security solutions and interoperability. The specifications of the one M2M standardization organization provide a framework to support a variety of applications and services such as smart cities, smart grids, connected cars, home automation, security and health.

SUMMARY

The present disclosure is directed to provide a method and apparatus for managing a subscription service in a machine-to-machine (M2M) system.

The present disclosure is directed to provide a method and apparatus for managing a number of subscriptions possessed by a device in a machine-to-machine (M2M) system.

The present disclosure is directed to provide a method and apparatus for managing a number of subscribed resources, which are not retrieved after being updated by a device, in an M2M system.

The present disclosure is directed to provide a method and apparatus for managing an access address of a subscribed resource in an M2M system.

According to an embodiment of the present disclosure, a method for operating a first device in a machine-to-machine (M2M) system may include: transmitting, to a second device, a first message for requesting a new subscription that uses a first resource for managing subscription; receiving, from the second device, a second message for notifying an update of a second resource associated with the new subscription; and identifying a content of the second resource, wherein the first resource may include at least one of a first attribute indicating a number of subscriptions possessed by the first device, a second attribute indicating, among resources to which the first device is subscribing, a number of resources which are updated but not yet retrieved, or a third attribute indicating an access address of a subscribed resource.

According to an embodiment of the present disclosure, a method for operating a second device in a machine-to-machine (M2M) system may include: receiving, from a first device, a first message for requesting a new subscription that uses a first resource for managing subscription; transmitting, to the first device, a second message for notifying an update of a second resource associated with the new subscription; and providing a content of the second resource, wherein the first resource may include at least one of a first attribute indicating a number of subscriptions possessed by the first device, a second attribute indicating, among resources to which the first device is subscribing, a number of resources which are updated but not yet retrieved, or a third attribute indicating an access address of a subscribed resource.

According to an embodiment of the present disclosure, a first device in a machine-to-machine (M2M) system may include a transceiver and a processor coupled with the transceiver. The process is configured to: transmit, to a second device, a first message for requesting a new subscription that uses a first resource for managing subscription, receive, from the second device, a second message for notifying an update of a second resource associated with the new subscription, and identify a content of the second resource, wherein the first resource may include at least one of a first attribute indicating a number of subscriptions possessed by the first device, a second attribute indicating, among resources to which the first device is subscribing, a number of resources which are updated but not yet retrieved, or a third attribute indicating an access address of a subscribed resource.

According to an embodiment of the present disclosure, a second device in a machine-to-machine (M2M) system may include a transceiver and a processor coupled with the transceiver. The process is configured to: receive, from a first device, a first message for requesting a new subscription that uses a first resource for managing subscription, transmit, to the first device, a second message for notifying an update of a second resource associated with the new subscription, and provide a content of the second resource, wherein the first resource may include at least one of a first attribute indicating a number of subscriptions possessed by the first device, a second attribute indicating, among resources to which the first device is subscribing, a number of resources which are updated but not yet retrieved, or a third attribute indicating an access address of a subscribed resource.

According to the present disclosure, a subscription service may be effectively managed in a machine-to-machine (M2M) system.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Figure 1:
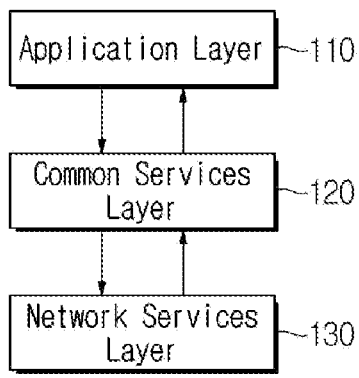
FIG. 1 illustrates a layered structure of a machine-to-machine (M2M) system according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component is referred to as being "linked", "coupled", or "connected" to another component, it is understood that not only a direct connection relationship but also an indirect connection relationship through an intermediate component may also be included.

In the present disclosure, components that are distinguished from each other are intended to clearly illustrate each feature. However, it does not necessarily mean that the components are separate. In other words, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various exemplary embodiments are also included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

In addition, the present specification describes a network based on Machine-to-Machine (M2M) communication, and a work in M2M communication network may be performed in a process of network control and data transmission in a system managing the communication network. In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the exemplary embodiment described above.

In addition, an M2M terminal may be fixed or have mobility. An M2M server refers to a server for M2M communication and may be a fixed station or a mobile station. In the present specification, an entity may refer to hardware like M2M device, M2M gateway and M2M server. In addition, for example, an entity may be used to refer to software configuration in a layered structure of M2M system and is not limited to the embodiment described above.

In addition, for example, the present disclosure mainly describes an M2M system but is not solely applied thereto. In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and are not limited to the embodiment described above.

The present disclosure relates to a method and apparatus for managing a subscription service in a machine-to-machine (M2M) system. Particularly, the present disclosure techniques for generating information on various aspects of the subscription service and managing the information related to the subscription service.

Further, one M2M is a de facto standards organization that was founded to develop a communal IoT service platform sharing and integrating application service infrastructure (platform) environments beyond fragmented service platform development structures limited to separate industries like energy, transportation, national defense and public service, where one M2M aims to render requirements for things to things communication and IoT technology, architectures, Application Program Interface (API) specifications, security solutions and interoperability. For example, the specifications of one M2M provide a framework to support a variety of applications and services such as smart cities, smart grids, connected cars, home automation, security and health. In this regard, one M2M has developed a set of standards defining a single horizontal platform for data exchange and sharing among all the applications. Applications across different industrial sections may also be considered by one M2M. Like an operating system, one M2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of a Machine-to-Machine (M2M) system according to the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that are grouped into CSFs according to functions. A multiplicity of instantiated CSFs constitutes CSEs. CSEs may interface with applications (for example, application entities or AEs in the terminology of one M2M), other CSEs and base networks (for example, network service entities or NSEs in the terminology of one M2M). The network services layer 130 may provide the common services layer 120 with services such as device management, location service and device triggering. Herein, an entity operating based on the network layer 120 may be a network service entity (NSE).

Figure 2:
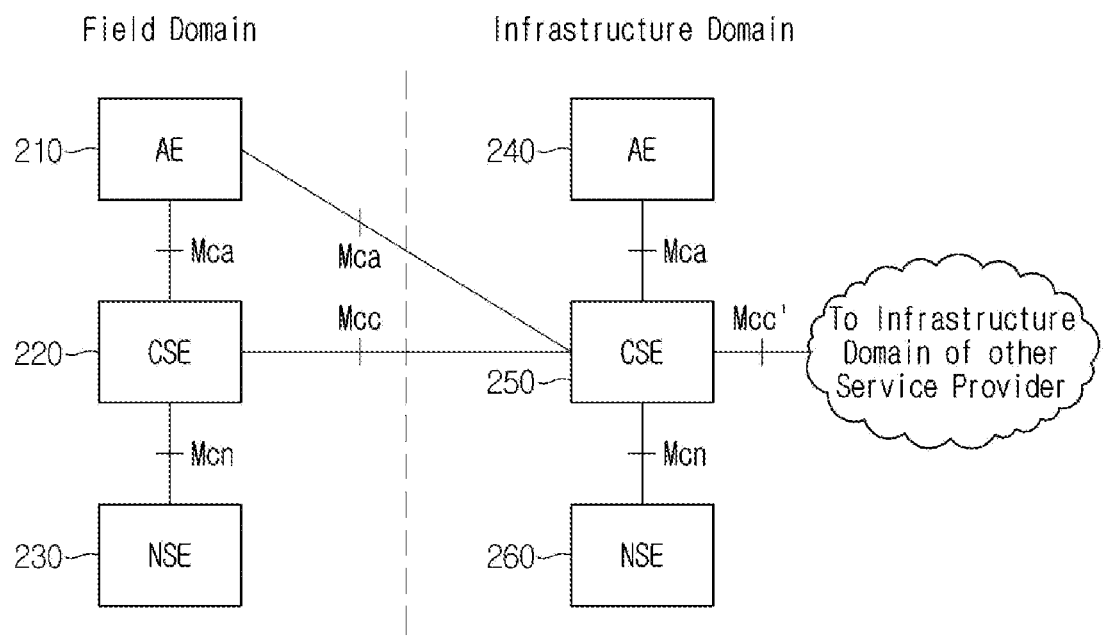
FIG. 2 illustrates a reference point in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
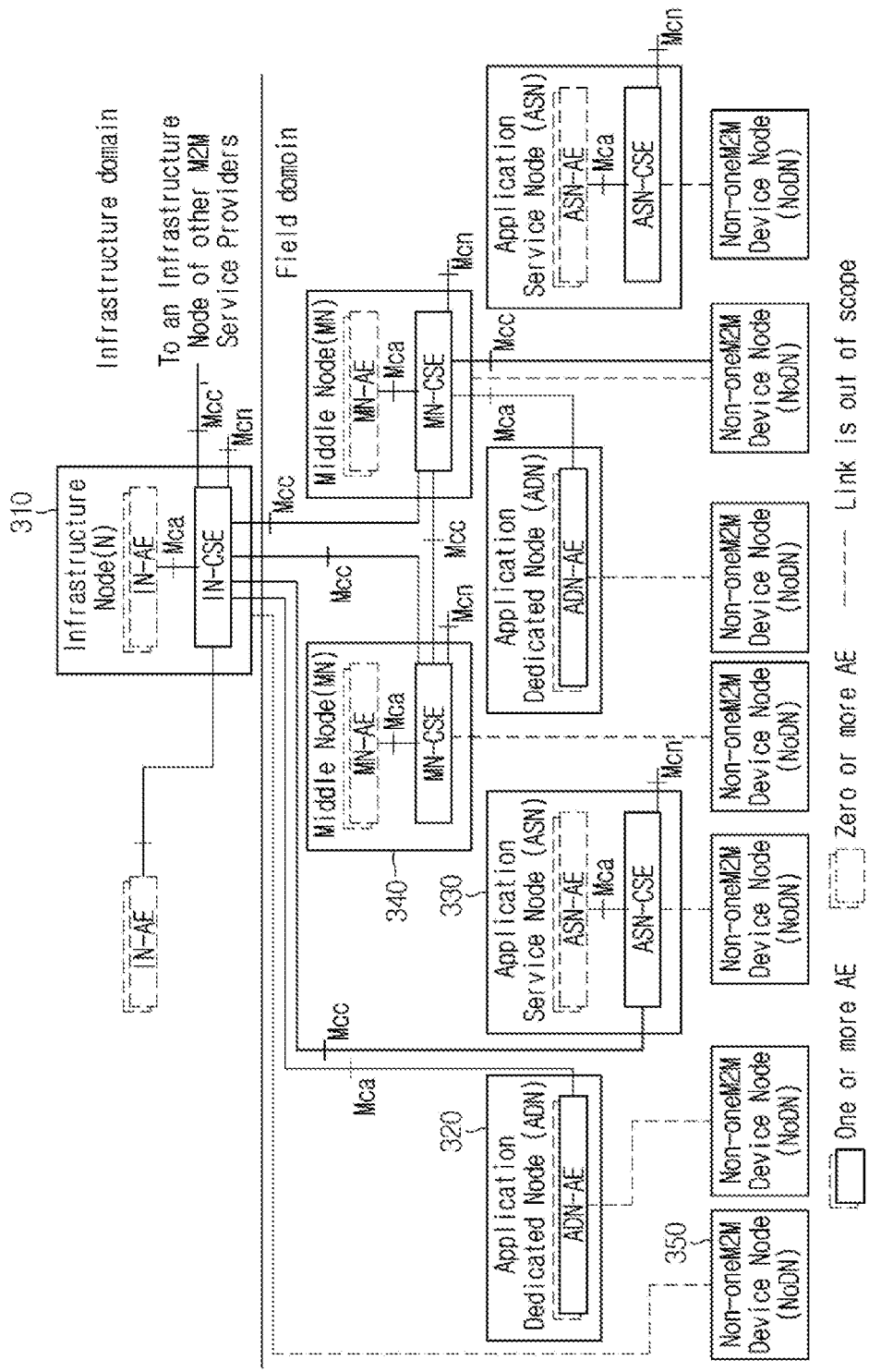
FIG. 3 illustrates each node in an M2M system according to the present disclosure.

FIG. 3 is a view illustrating each node in an M2M system according to the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) is a node that does not include M2M entities. It may be a node that performs management or collaboration together with an M2M system.

Figure 4:
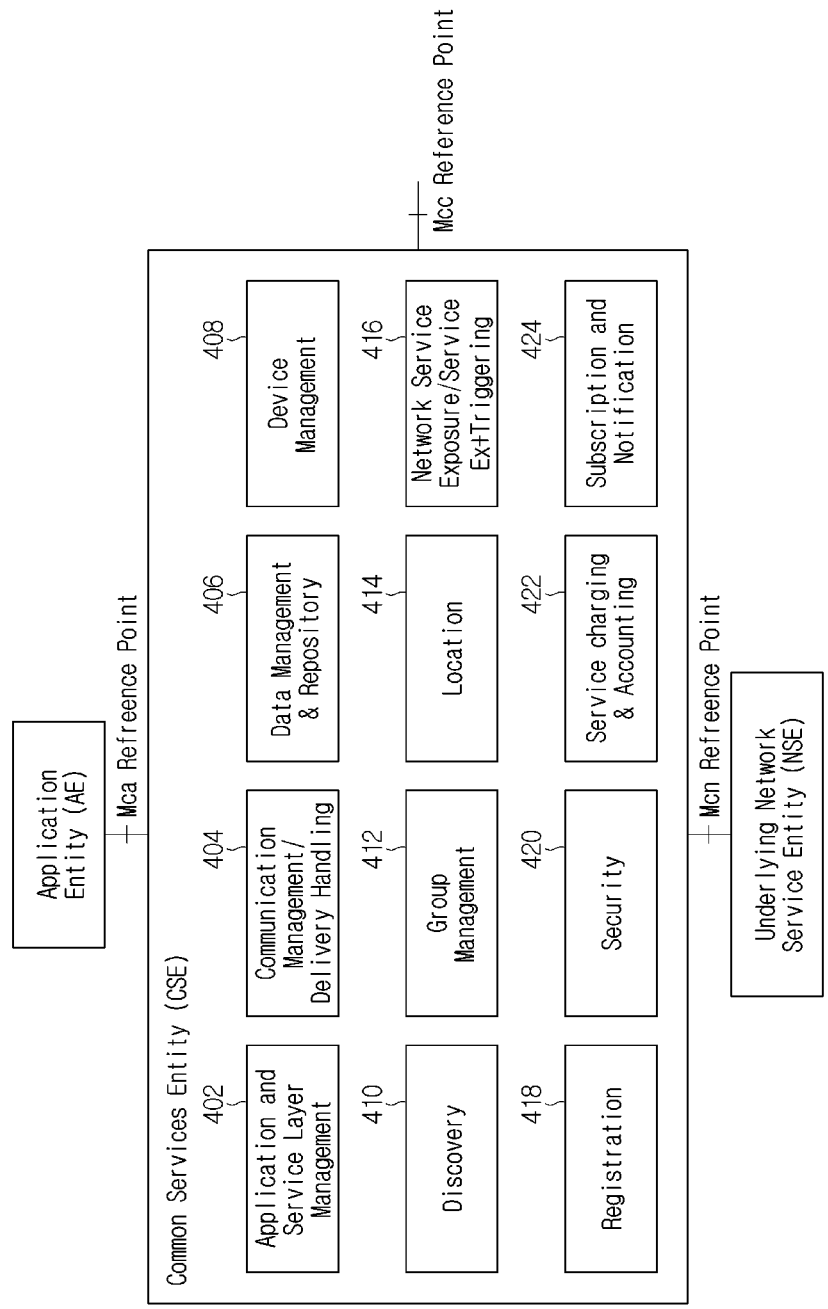
FIG. 4 illustrates a common service function in an M2M system according to the present disclosure.

FIG. 4 is a view illustrating a common service function in an M2M system according to the present disclosure. Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and is not limited to the above-described exemplary embodiment.

The application and service layer management 402 CSF provides management of AEs and CSEs. The application and service layer management 402 CSF includes not only the configuring, problem solving and upgrading of CSE functions but also the capability of upgrading AEs. The communication management and delivery handling 404 CSF provides communications with other CSEs, AEs and NSEs. The communication management and delivery handling 404 CSF are configured to determine at what time and through what connection communications are to be delivered, and also determine to buffer communication requests to deliver the communications later, if necessary and permitted.

The data management and repository 406 CSF provides data storage and transmission functions (for example, data collection for aggregation, data reformatting, and data storage for analysis and sematic processing). The device management 408 CSF provides the management of device capabilities in M2M gateways and M2M devices.

The discovery 410 CSF is configured to provide an information retrieval function for applications and services based on filter criteria. The group management 412 CSF provides processing of group-related requests. The group management 412 CSF enables an M2M system to support bulk operations for many devices and applications. The location 414 CSF is configured to enable AEs to obtain geographical location information.

The network service exposure/service execution and triggering 416 CSF manages communications with base networks for access to network service functions. The registration 418 CSF is configured to provide AEs (or other remote CSEs) to a CSE. The registration 418 CSF allows AEs (or remote CSE) to use services of CSE. The security 420 CSF is configured to provide a service layer with security functions like access control including identification, authentication and permission. The service charging and accounting 422 CSF is configured to provide charging functions for a service layer. The subscription/notification 424 CSF is configured to allow subscription to an event and notifying the occurrence of the event.

Figure 5:
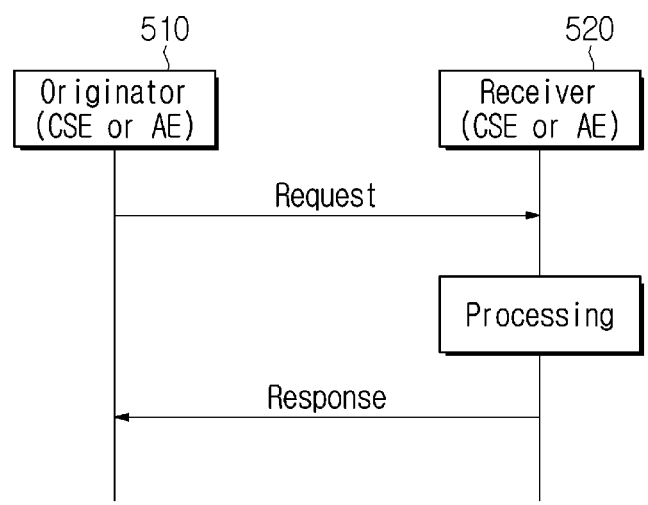
FIG. 5 illustrates a method in which an originator and a receiver exchange a message in an M2M system according to the present disclosure.

FIG. 5 is a view illustrating that an originator and a receiver exchange a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers or gateways, which are described above. In other words, the originator 510 and the receiver 520 may be hardware or software configurations and are not limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete and Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, in response to determining that a parameter is valid and authorized, the receiver 520 may be configured to check whether there is a requested resource and perform processing accordingly.

For example, in case an event occurs, the originator 510 may be configured to transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

| Response message parameter/success or not |
| --- |
| Response Status Code-successful, unsuccessful, ack |
| Request Identifier-uniquely identifies a Request message |
| Content-to be transferred |
| To-the identifier of the Originator or the Transit CSE that sent the corresponding non-blocking request |
| From-the identifier of the Receiver |
| Originating Timestamp-when the message was built |
| Result Expiration Timestamp - when the message expires |

TABLE 1-continued

| Response message parameter/success or not |
| --- |
| Event Category-what event category shall be used for the response message |
| Content Status |
| Content Offset |
| Token Request Information |
| Assigned Token Identifiers |
| Authorization Signature Request Information |
| Release Version Indicator-the oneM2M release version that this response message conforms to |

A filter criteria condition, which can be used in a request message or a response message, may be defined as in Table 2 and Table 3 below.

TABLE 2

| Condition tag | Multip-licity | Description |
| --- | --- | --- |
| | | Matching Conditions |
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentSize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator = Sam", "creator = Sam*", "creator = *Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery. |

TABLE 2-continued

| Condition tag | Multip-licity | Description |
|---|---|---|
| | | Matching Conditions |
| | | In the case of semantic resource discovery targeting a specific resource, if the semantic description contained in the <semanticDescriptor> of a child resource matches the semanticFilter, the URI of this child resource will be included in the semantic resource discovery result. |
| | | In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multip-licity | Description |
|---|---|---|
| | | Filter Handling Conditions |
| filterUsage | 0 . . . 1 | Indicates how the filter criteria is used. If provided, possible values are 'discovery' and 'IPEOnDemandDiscovery'. |
| | | If this parameter is not provided, the Retrieve operation is a generic retrieve operation and the content of the child resources fitting the filter criteria is returned. |
| | | If filterUsage is 'discovery', the Retrieve operation is for resource discovery (clause 10.2.6), i.e. only the addresses of the child resources are returned. |
| | | If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. . . . /tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

| | Request message parameter |
|---|---|
| Mandatory | Operation-operation to be executed/CREAT, Retrieve, Update, Delete, Notify |
| | To-the address of the target resource on the target CSE |
| | From-the identifier of the message Originator |
| | Request Identifier-uniquely identifies a Request message |

TABLE 4-continued

| | Request message parameter |
|---|---|
| Operation dependent | Content-to be transferred |
| | Resource Type-of resource to be created |
| Optional | Originating Timestamp-when the message was built |
| | Request Expiration Timestamp-when the request message expires |
| | Result Expiration Timestamp-when the result message expires |
| | Operational Execution Time-the time when the specified operation is to be executed by the target CSE |
| | Response Type-type of response that shall be sent to the Originator |
| | Result Persistence-the duration for which the reference containing the responses is to persist |

TABLE 4-continued

Request message parameter

Result Content-the expected components of the result
Event Category-indicates how and when the system should deliver the message
Delivery Aggregation-aggregation of requests to the same target CSE is to be used
Group Request Identifier-Identifier added to the group request that is to be fanned out to each member of the group
Group Request Target Members-indicates subset of members of a group
Filter Criteria-conditions for filtered retrieve operation
Desired Identifier Result Type-format of resource identifiers returned
Token Request Indicator-indicating that the Originator may attempt Token Request procedure (for Dynamic Authorization) if initiated by the Receiver
Tokens-for use in dynamic authorization
Token IDs-for use in dynamic authorization
Role IDs-for use in role based access control
Local Token IDs-for use in dynamic authorization
Authorization Signature Indicator-for use in Authorization Relationship Mapping
Authorization Signature-for use in Authorization Relationship Mapping
Authorization Relationship Indicator-for use in Authorization Relationship Mapping
Semantic Query Indicator-for use in semantic queries
Release Version Indicator-the oneM2M release version that this request message conforms to.
Vendor Information A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE. An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to create a child resource at a remote CSE, which is not present as a child of an original resource or is not an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

Events generated by resources may be received using the <subscription> resource. The <subscription> resource contains subscription information for its "subscribed-to" resource. That is, <subscription> resource is a child resource of the "subscribed-to" resource.

An originator, which has a status of resource subscriber, has RETRIEVE privileges to the "subscribed-to" resource in order to create the <subscription> resource. Notification policies specified in attributes may be applied to the <subscription> resource. For example, notification policies specify which, when, and how notifications are to be sent. Specifically, 'batchNotify' attribute specifies that notification is received in batches rather than one at a time.

Figure 6:
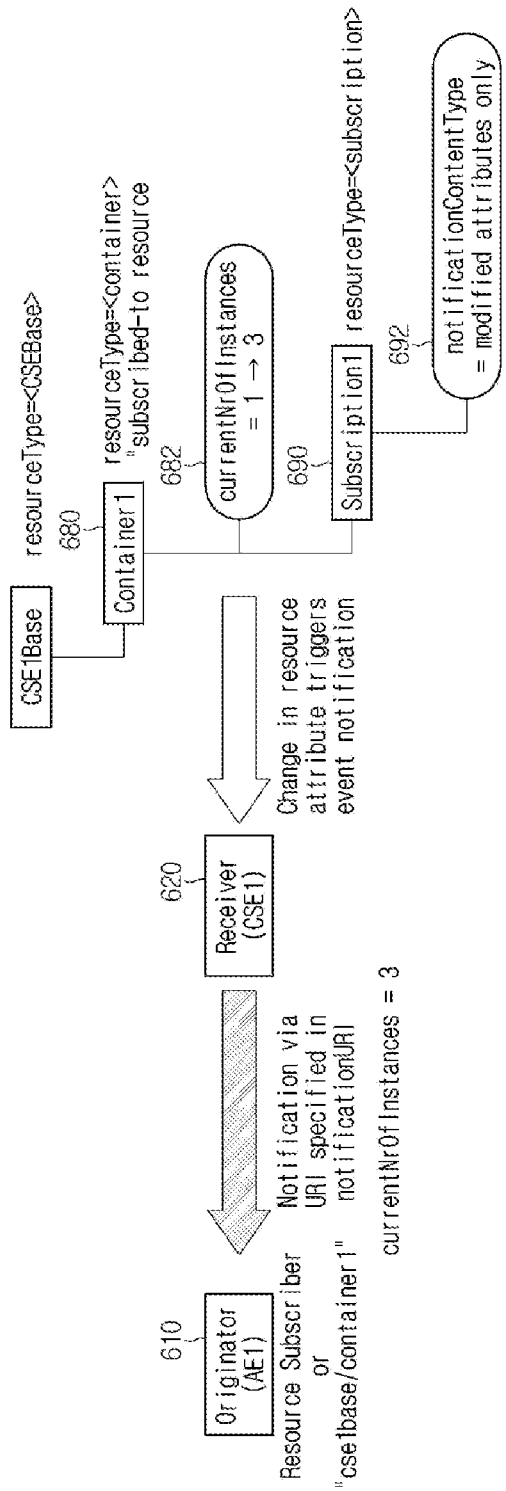
FIG. 6 illustrates an example structure of a resource associated with a subscription service in a conventional M2M system.

FIG. 6 illustrates an example structure of a resource associated with a subscription service in a conventional M2M system. Referring to FIG. 6, AE1 610 may subscribe to 'container1' resource 680 stored in CSE1 620. The 'container1' resource 680 contains 'currentNrOfInstance' attribute 682 and contains 'Subscription1' resource 690 as a sub-resource. The 'Subscription1' resource 690 contains 'notificationContentType' attribute 692, and the 'notificationContentType' attribute 692 is set as 'modified attributes only' to specify that information only for a notified attribute is included in notification. Accordingly, at least one of attributes in the 'container1' resource 680 is updated, the CSE1 620 transmits notification to the AE1 610.

An originator may have multiple subscriptions. For example, when an originator operates an application monitoring about 100 sensors, the originator should have about 100 subscriptions. A one M2M system only manages which applications subscribe to which resources.

When the originator wants to know what it has subscribed, the originator may operate as follows. The originator stores all the subscriptions. The originator transmits query to all the resources in a server and analyzes the contents of results. However, when there are many subscriptions, the above-described operations may take a lot of time and be inefficient.

Accordingly, the present disclosure suggests to introduce a resource containing information for managing resources to which a specific originator or a specific application subscribes. According to various embodiments, when there is a resource (e.g., 'mySubscription' resource) that manages subscribed resources of an IoT application (e.g., originator), the application may easily manage subscribed resources. Also, when the originator subscribes to the 'mySubscription' resource, the originator may be notified whenever there are any notifications. A subscribed resource may transmit notification to the 'mySubscription' resource. The number of subscriptions may be managed as an attribute of the 'mySubscription' resource.

For management of subscriptions, the present disclosure suggests a resource and attributes associated with subscriptions. A resource associated with a subscription may be defined to contain at least one attribute for managing a subscription service. Hereinafter, for convenience of explanation, a resource associated with a subscription is referred to as 'subscription management resource'.

Figure 7:
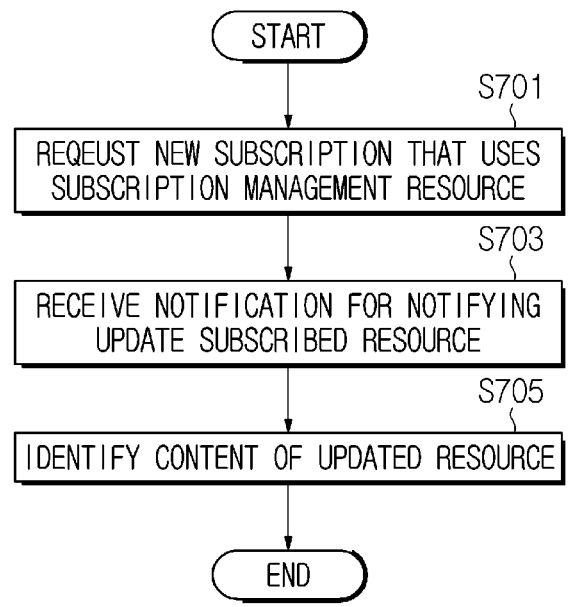
FIG. 7 illustrates an example procedure of using a subscription service in an M2M system according to the present disclosure.

FIG. 7 illustrates an example procedure of using a subscription service in an M2M system according to the present disclosure. FIG. 7 illustrates an operation method of a device in which an application requesting a subscription service is executed.

Referring to FIG. 7, at step S701, the device requests a new subscription that uses a subscription management resource. In other words, the device transmits a request message for requesting the new subscription to a device which provides a subscription service. In addition, the device requests the requested subscription service to be managed by the subscription management resource. For this, the request message includes information on a target resource of subscription and information indicating usage of the subscription management resource.

At step S703, the device receives a notification for notifying an update of a subscribed resource. In other words, the device receives a notification message for notifying that a content contained in a subscribed resource is updated. The notification message includes information on at least one of an updated resource or an updated attribute.

At step S705, the device identify a content of the updated resource. That is, the device checks or reads the content of the updated resource. For example, the device transmits a message for requesting retrieval of the updated resource to a device possessing the resource and receives the content of the updated resource as a response to the sent message.

Figure 8:
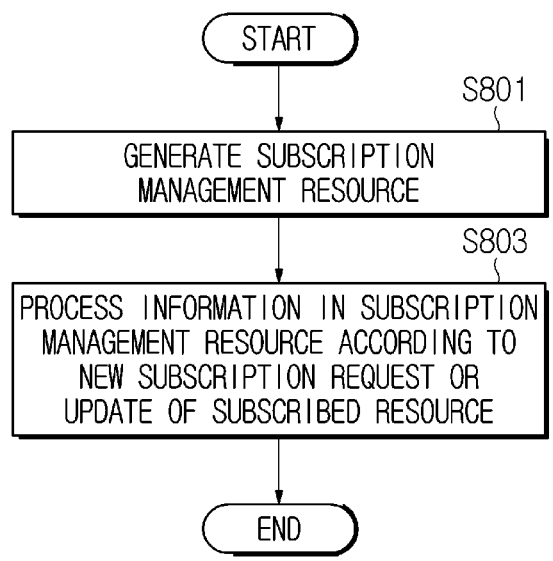
FIG. 8 illustrates an example procedure of providing a subscription service in an M2M system according to the present disclosure.

FIG. 8 illustrates an example procedure of providing a subscription service in an M2M system according to the present disclosure. FIG. 8 illustrates an operation method of a device in which a service entity providing a subscription service is implemented.

Referring to FIG. 8, at step S801, the device generates a subscription management resource. The subscription management resource is generated for a device (hereinafter referred to as 'requesting device') which requests or is capable of requesting a subscription service. According to various embodiments, the subscription management resource may be generated in response as the requesting device requests a subscription service first or in a connection establishment procedure or a registration procedure with the requesting device. According to an embodiment, the subscription management resource may contain at least one of a first attribute indicating the number of subscriptions possessed by the requesting device, a second attribute indicating, among resources to which the requesting device is subscribing, the number of resources which are updated but not yet retrieved, or a third attribute indicating an access address of a subscribed resource.

At step S803, the device processes information in the subscription management resource according to a new subscription request or an update of a subscribed resource. The subscription management resource may contain at least one attribute associated with a subscription service of the requesting device. Thus, according to an event (e.g., occurrence of a new subscription request, an update of a subscribed resource) corresponding to an attribute, a value of the attribute may be updated.

Figure 9:
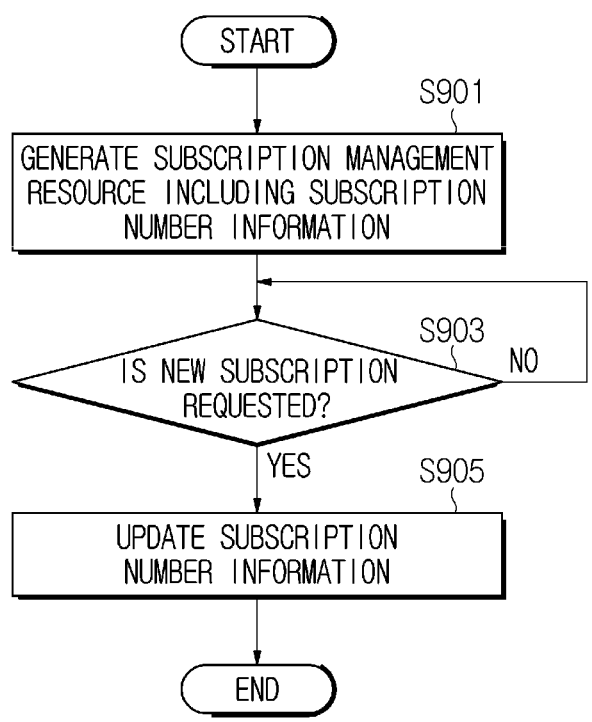
FIG. 9 illustrates an example procedure of managing subscription number information in an M2M system according to the present disclosure.

FIG. 9 illustrates an example procedure of managing subscription number information in an M2M system according to the present disclosure. FIG. 9 illustrates an operation method of a device in which a service entity providing a subscription service is implemented.

Referring to FIG. 9, at step S901, a device generates a subscription management resource containing subscription number information. The subscription management resource is generated for a device (hereinafter referred to as 'requesting device') which requests or is capable of requesting a subscription service. According to various embodiments, the subscription management resource may be generated in response as the requesting device requests a subscription service first or in a connection establishment procedure or a registration procedure with the requesting device.

At step S903, the device checks whether or not a request for a new subscription occurs. That is, the device checks whether or not a message for requesting a new subscription service is received from a requesting device. Herein, the new subscription service means that at least one non-subscribed resource is added as a target of subscription.

When a request for a new subscription occurs, at step S905, the device updates the subscription number information. The subscription number information is an attribute that indicates the number of subscription services possessed by a requesting device. As one subscription service monitors an event associated with at least one resource, a value of the subscription number information may be equal to or less than the number of resources which are being subscribed.

Figure 10:
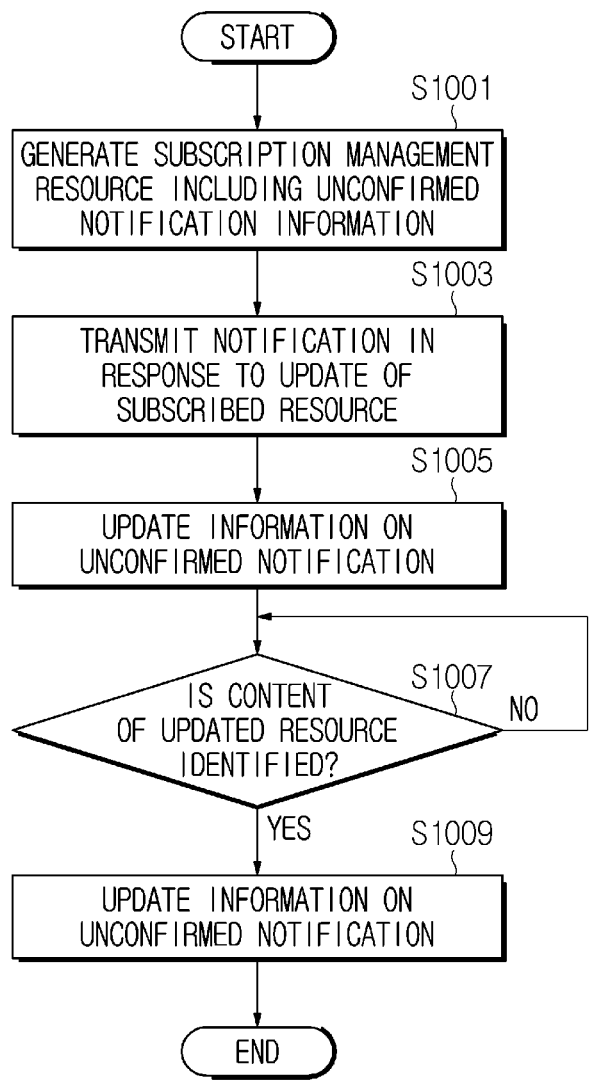
FIG. 10 illustrates an example procedure of managing unconfirmed notification information in an M2M system according to the present disclosure.

FIG. 10 illustrates an example procedure of managing unconfirmed notification information in an M2M system according to the present disclosure. FIG. 10 illustrates an operation method of a device in which a service entity providing a subscription service is implemented.

Referring to FIG. 10, at step S1001, a device generates a subscription management resource containing unconfirmed notification information. The subscription management resource is generated for a device (hereinafter referred to as 'requesting device') which requests or is capable of requesting a subscription service. According to various embodiments, the subscription management resource may be generated in response as the requesting device requests a subscription service first or in a connection establishment procedure or a registration procedure with the requesting device.

At step S1003, the device transmits a notification in response to an update for a subscribed resource. The device may update a content of the subscribed resource in response to the occurrence of an event associated with the subscribed resource. Accordingly, the device confirms at least one subscriber to the resource and transmits a notification message for notifying the update of the content to the at least one subscriber. Herein, the at least one subscriber includes a requesting device.

At step S1005, the device updates unconfirmed notification information. The unconfirmed notification information is an attribute included in a subscription management resource for a requesting device. The unconfirmed notification information includes a value of counting the number of resources which are not retrieved yet after notification to the requesting device. In response to the notification at step S1003, the device increases the unconfirmed notification information for the requesting device by 1.

At step S1007, the device checks whether or not a content of an updated resource is retrieved. In other words, the device checks whether or not a requesting device receiving a notification retrieves an updated content of a subscribed resource. Whether or not the requesting device retrieves the updated content may be determined based on whether or not a content is provided in response to receiving a retrieval message.

When the requesting device retrieves the updated content, at step S1009, the device updates the unconfirmed notification information. That is, as the subscribed resource is retrieved after the notification is sent, the device decreases the value included in the unconfirmed notification information by 1.

As in the embodiment described with reference to FIG. 10, a device may identify how many updated resources are not retrieved among resources subscribed by a specific subscriber by using unconfirmed notification information contained in a subscription management resource. Unconfirmed notification information may be utilized in various ways. According to an embodiment, when a value of unconfirmed notification information exceeds a threshold, a device may notify that resources updated but not retrieved are accumulated. Accordingly, an operation may be performed to prevent a situation in which resources updated but not retrieved are so excessively accumulated that there is a significant gap between information possessed by a requesting device and latest information.

As described above, information associated with subscription may be managed using a resource for managing a subscription service. For example, a resource and attributes for managing a subscription service according to various embodiments may include at least one of the resource and attributes in Table 5 below.

TABLE 5

| name | Description |
| --- | --- |
| mySubscription | This resource manages subscription and notification related information for an IoT application. |
| currentNrOfSubscriptions | This attribute contains the current number of subscriptions of the IoT application. |
| unreadNotifications | This attributes indicates that there is unread notification and where to find out the notification. |
| subscriptionURIs | This attributes contains the URIs of subscribed resources. Type of this attribute is list. |

Figure 11:
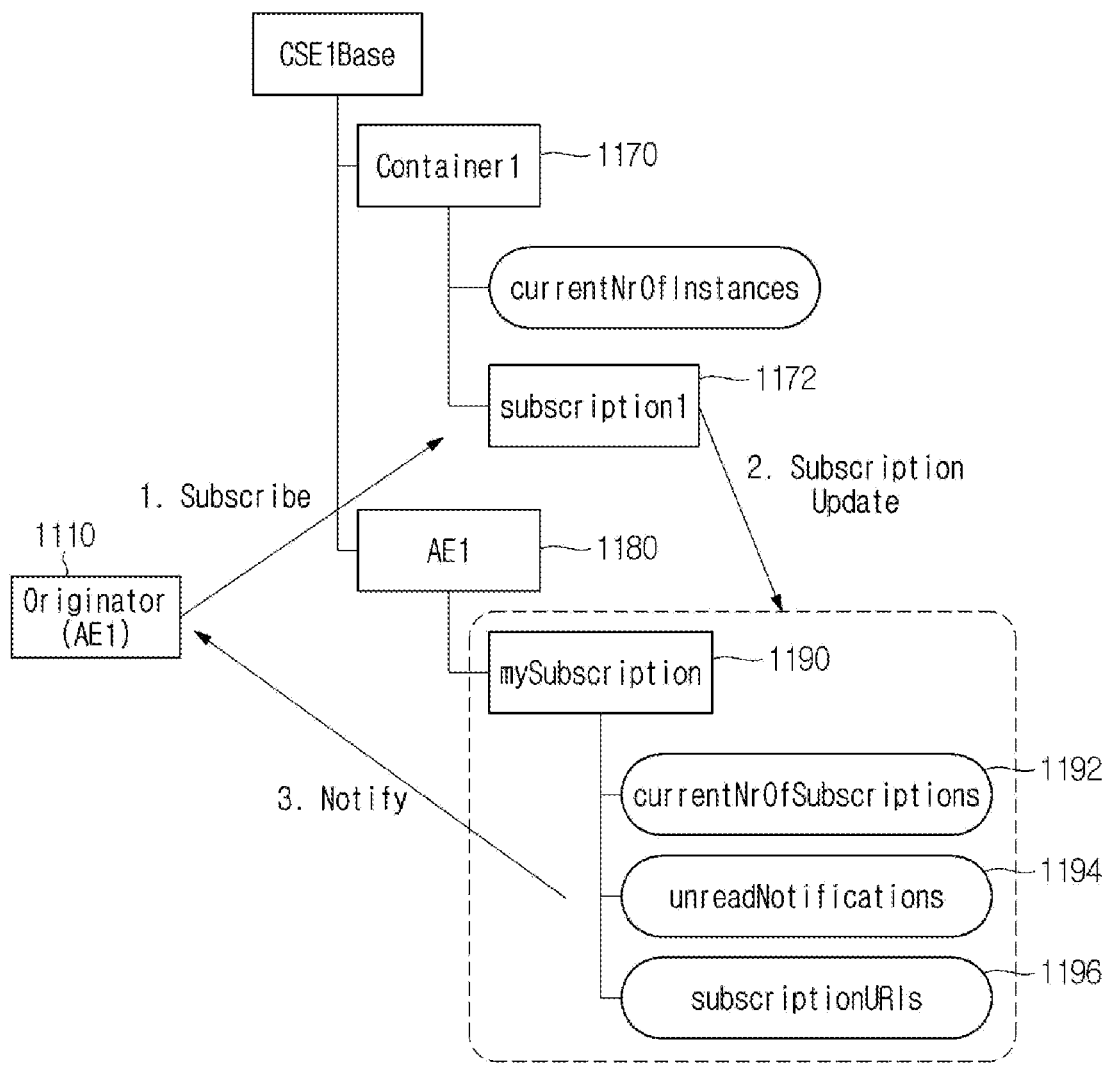
FIG. 11 illustrates an example structure of a resource for managing a subscription service in an M2M service according to the present disclosure.

FIG. 11 illustrates an example structure of a resource for managing a subscription service in an M2M service according to the present disclosure. FIG. 11 illustrates a structure of a resource to which the resource and attributes listed in Table 5 are applied. Referring to FIG. 11, AE1 1110 requests a subscription to 'container1' resource. Accordingly, a subscription update is performed so that 'subscription1' resource contained in 'container1' resource 1170 may refer to 'mySubscription' resource 1190, which is a sub-resource in 'AE1' resource 1180. That is, a resource associated with a subscriber contained in the 'container1' resource 1170 is set to refer to the 'mySubscription' resource 1190 in the 'AE1' resource 1180. The 'mySubscription' resource 1190 contains 'currentNrOfSubscriptions' attribute 1192, 'unreadNotifications' attribute 1194, and 'subscriptionURIs' attribute 1196. Based on the attributes 1192, 1194 and 1196, an update of the 'container1' resource 1170 may be notified to the AE1 1110.

Figure 12:
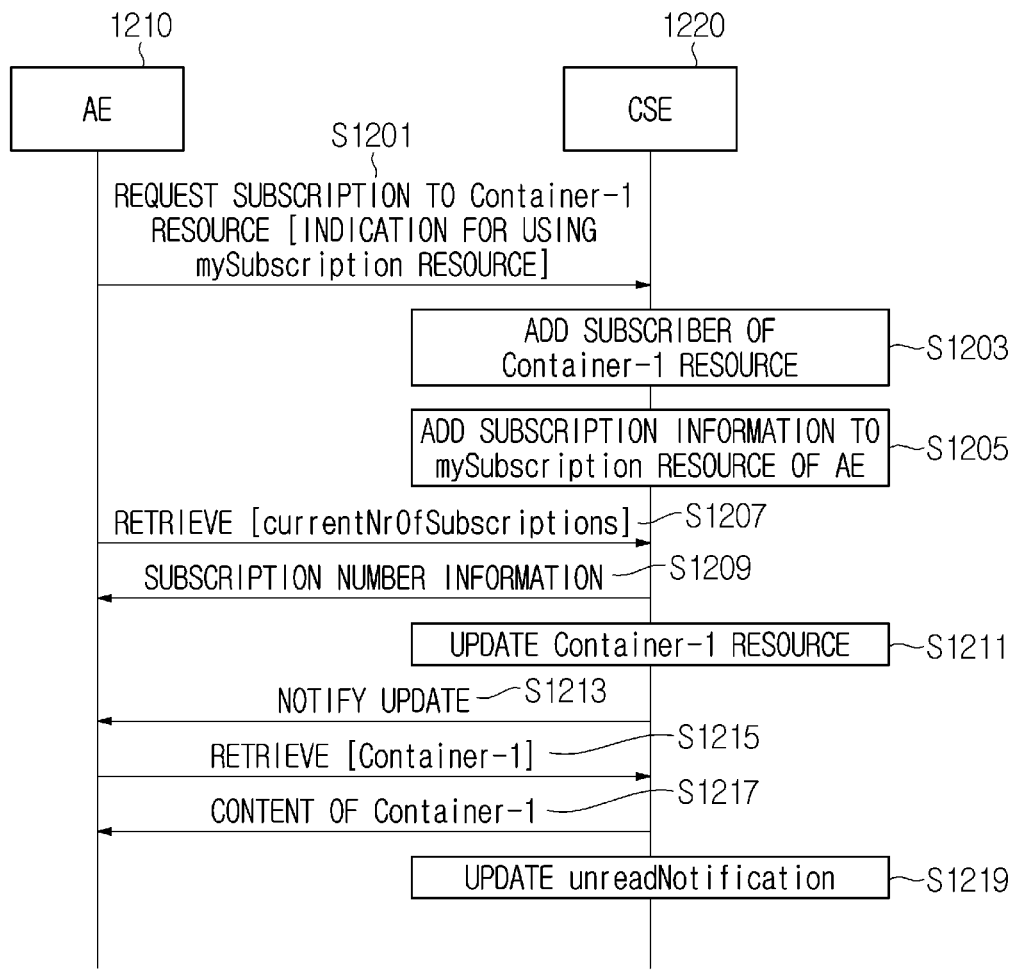
FIG. 12 illustrates an example procedure of managing a subscription service by using a subscription management resource in an M2M system according to the present disclosure.

FIG. 12 illustrates an example procedure of managing a subscription service by using a subscription management resource in an M2M system according to the present disclosure. FIG. 12 illustrates a signal exchange between AE 1210 requesting a subscription service and CSE 1220 providing the subscription service.

Referring to FIG. 12, at step S1201, the AE 1210 requests a subscription to 'container-1' resource. That is, the AE 1210 transmits a message for requesting a subscription to the 'container-1' resource. Herein, the AE 1210 indicates that 'mySubscription' resource is used. In other words, the AE 1210 requests subscription information for the 'container-1' resource to refer to the 'mySubscription' resource.

At step S1203, the CSE 1220 adds the AE 1210 to a subscriber of the 'container-1' resource. In other words, the CSE 1220 includes information on the AE 1210 in a subscription information resource under the 'container-1' resource, that is, the 'subscription1' resource.

At step S1205, the CSE 1220 adds corresponding subscription information in the 'mySubscription' resource of the AE 1210. In other words, the CSE 1220 sets a reference relationship on the 'subscription1' resource and the 'mySubscription' resource of the AE 1210.

At step S1207, the AE 1210 retrieves the current number of subscriptions of the AE 1210 through RETRIEVE command for the 'mySubscription' resource of the AE 1210. The 'currentNrOfSubscriptions' attribute includes an exact number of subscribed resources.

At step S1209, the CSE 1220 transmits subscription number information to the AE 1210. That is, the CSE 1220 transmits a value of the 'currentNrOfSusbcriptions' attribute to the AE 1210.

At step S1211, the CSE 1220 updates the 'container-1' resource. For example, as an event associated with the 'container-1' resource occurs, an update for the 'container-1' resource occurs.

At step S1213, the CSE 1220 notifies the update to the AE 1210. In other words, the CSE 1220 transmits a message for notifying the update to the AE 1210. Specifically, the CSE 1220 examines subscriptions to the 'container-1' resource and notifies the update to corresponding subscribers. Herein, the 'unreadNotifications' attribute includes a sent notification. When the 'unreadNotifications' attribute has a value of 0, the 'unreadNotifications' attribute is updated to 1.

At step S1215, the AE 1210 requests the CSE 1220 to retrieve the 'container-1' resource. That is, the AE 1210 requests a content of the updated 'container-1' resource.

At step S1217, the CSE 1220 transmits the content of the updated 'container-1' resource to the AE 1210. That is, the CSE 1220 provides the content of the updated 'container-1' resource in response to the retrieval request of the AE 1210. Thus, the AE 1210 may obtain the content of the updated 'container-1' resource.

At step S1219, the CSE 1220 updates the 'unreadNotification' attribute. As the content of the updated 'container-1' resource is provided to the AE 1210, the CSE 1220 decreases the 'unreadNotifications' attribute by 1. For example, as the AE 1210 reads the content of the updated 'container-1' resource, the 'unreadNotifications' attribute is set to 0.

Figure 13:
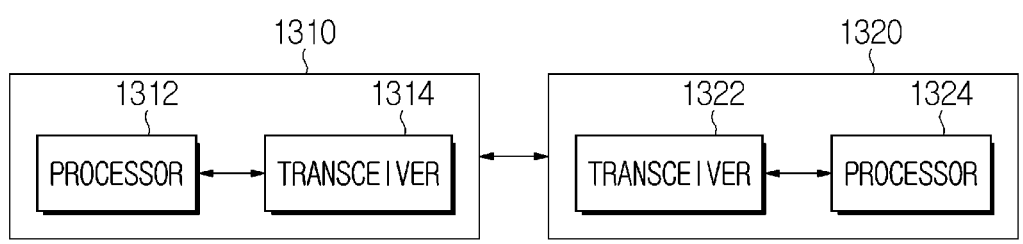
FIG. 13 illustrates a configuration of an M2M device in an M2M system according to the present disclosure.

FIG. 13 illustrates a configuration of an M2M device in an M2M system according to the present disclosure. An M2M device 1310 or an M2M device 1320 illustrated in FIG. 13 may be understood as hardware functioning as at least one among the above-described AE, CSE and NSE.

Referring to FIG. 13, the M2M device 1310 may include a processor 1312 controlling a device and a transceiver 1314 transmitting and receiving a signal. Herein, the processor 1312 may control the transceiver 1314. In addition, the M2M device 1310 may communicate with another M2M device 1320. The another M2M device 1320 may also include a processor 1322 and a transceiver 1324, and the processor 1322 and the transceiver 1324 may perform the same function as the processor 1312 and the transceiver 1314.

As an example, the originator, the receiver, AE and CSE, which are described above, may be one of the M2M devices 1310 and 1320 of FIG. 13, respectively. In addition, the devices 1310 and 1320 of FIG. 13 may be other devices. As an example, the devices 1310 and 1320 of FIG. 13 may be communication devices, vehicles, or base stations. That is, the devices 1310 and 1320 of FIG. 13 refer to devices capable of performing communication and are not limited to the above-described embodiment.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations can be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both disclosures may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

What is claimed is:

1. A method for operating a first device in a machine-to-machine (M2M) system, the method comprising:
    transmitting, to a second device, a first message requesting a new subscription, wherein the first message includes information on a second resource to be subscribed to and information indicating use of a first resource for subscribing to the second resource;
    receiving, from the second device, a second message notifying that the second resource associated with the new subscription is updated; and
    identifying a content of the second resource,
    wherein the first resource is a resource that manages subscribed resources of the first device and includes at least one of a first attribute indicating a number of subscriptions of the first device, a second attribute indicating, among resources to which the first device is subscribing, a number of resources which are updated but not yet retrieved, or a third attribute indicating access addresses of the subscribed resources; and
    wherein a value of the first attribute increases in response as the new subscription is requested.

2. The method of claim 1, wherein a value of the second attribute increases in response to transmitting the second message and decreases in response as the first device retrieves a content of the second resource.

3. The method of claim 1, further comprising:
    transmitting, to the second device, a third message for requesting subscription number information of the first device; and
    receiving, from the second device, a fourth message including the subscription number information.

4. A method for operating a second device in a machine-to-machine (M2M) system, the method comprising:
    receiving, from a first device, a first message requesting a new subscription, wherein the first message includes information on a second resource to be subscribed to and information indicating use of a first resource for subscribing to the second resource;
    transmitting, to the first device, a second message notifying that the second resource associated with the new subscription is updated; and
    providing a content of the second resource,
    wherein the first resource is a resource that manages subscribed resources of the first device and includes at least one of a first attribute indicating a number of subscriptions of the first device, a second attribute indicating, among resources to which the first device is subscribing, a number of resources which are updated but not yet retrieved, or a third attribute indicating access addresses of subscribed resources; and
    wherein a value of the first attribute increases in response as the new subscription is requested.

5. The method of claim 4, wherein a value of the second attribute increases in response to receiving the second message and decreases in response as the first device retrieves a content of the second resource.

6. The method of claim 4, further comprising:
    receiving, from the first device, a third message for requesting subscription number information of the first device; and
    transmitting, to the first device, a fourth message including the subscription number information.

7. The method of claim 4, further comprising setting a resource associated with a subscription in the second resource so as to refer to the first resource.

8. The method of claim 4, wherein the first resource is generated in response to an initial subscription service request of the first device, or in a connection establishment procedure or a registration procedure with the first device.

9. A first device in a machine-to-machine (M2M) system, the first device comprising:
    a transceiver; and
    a processor coupled with the transceiver,
    wherein the processor is configured to:
        transmit, to a second device, a first message requesting a new subscription, wherein the first message includes information on a second resource to be subscribed to and information indicating use of a first resource for subscribing to the second resource,
        receive, from the second device, a second message notifying that the second resource associated with the new subscription is updated, and
        identify a content of the second resource,
    wherein the first resource is a resource that manages subscribed resources of the first device and includes at least one of a first attribute indicating a number of subscriptions of the first device, a second attribute indicating, among resources to which the first device is subscribing, a number of resources which are updated but not yet retrieved, or a third attribute indicating access addresses of the subscribed resources, and
    wherein a value of the first attribute increases in response as the new subscription is requested.

10. The first device of claim 9, wherein a value of the second attribute increases in response to transmitting the second message and decreases in response as the first device retrieves a content of the second resource.

11. The first device of claim 9, wherein the processor is further configured to:
    transmit, to the second device, a third message for requesting subscription number information of the first device; and receive, from the second device, a fourth message including the subscription number information.

\* \* \* \* \*